United States Patent
Gheysens

(10) Patent No.: US 11,085,671 B2
(45) Date of Patent: Aug. 10, 2021

(54) EFFICIENT GEOTHERMAL HEAT ENERGY EXTRACTION SYSTEM

(71) Applicant: SIDLABZ, Sint-Martens-Latem (BE)

(72) Inventor: Simon Maurice Gheysens, Tielt (BE)

(73) Assignee: SIDLABZ, Sint-Martens-Latem (BE)

( * ) Notice: Subject to any disclaimer, the term of this patent is extended or adjusted under 35 U.S.C. 154(b) by 101 days.

(21) Appl. No.: 16/612,335

(22) PCT Filed: May 9, 2018

(86) PCT No.: PCT/EP2018/062125
§ 371 (c)(1),
(2) Date: Nov. 8, 2019

(87) PCT Pub. No.: WO2018/206712
PCT Pub. Date: Nov. 15, 2018

(65) Prior Publication Data
US 2020/0072506 A1    Mar. 5, 2020

(30) Foreign Application Priority Data

May 9, 2017    (WO) ................ PCT/EP2017/061052

(51) Int. Cl.
*F24T 10/30*    (2018.01)
*F24T 10/40*    (2018.01)
(Continued)

(52) U.S. Cl.
CPC .............. *F24T 10/30* (2018.05); *F24T 10/13* (2018.05); *F24T 10/40* (2018.05); *F28D 15/02* (2013.01); *F24T 2010/50* (2018.05); *Y02E 10/10* (2013.01)

(58) Field of Classification Search
CPC ........... F24T 10/40; Y02E 10/10; F28D 15/02
(Continued)

(56) References Cited

U.S. PATENT DOCUMENTS

| 2010/0276115 | A1 | 11/2010 | Parrella |
| 2015/0013981 | A1 | 1/2015 | Shimko et al. |
| 2015/0292774 | A1* | 10/2015 | Kang ............... F24T 10/40 |
| | | | 165/45 |

FOREIGN PATENT DOCUMENTS

| JP | H07286760 A | 10/1995 |
| JP | H07332882 A | 12/1995 |

(Continued)

OTHER PUBLICATIONS

International Preliminary Report on Patentability dated Aug. 2, 2019, issued in corresponding International Application No. PCT/EP2018/062125 filed May 9, 2018, 19 pages.

(Continued)

*Primary Examiner* — Mark A Laurenzi
*Assistant Examiner* — Mickey H France
(74) *Attorney, Agent, or Firm* — Christensen O'Connor Johnson Kindness PLLC

(57) ABSTRACT

A system for extracting geothermal heat energy: includes a geothermal well formed in surrounding crust material and extending from a well top part down to a depth where the surrounding crust material has elevated geothermal temperatures. The geothermal well includes a heat medium contained within geothermal well walls. The heat medium is heated at a well bottom part by heat extracted from the surrounding crust material, evaporating and rising to carry heat energy towards the well top part. A heat extractor, extracts heat energy from the heat medium at the well top part. At least one heat conductive path extends outwardly from the geothermal well into the crust material to conduct geothermal heat from the crust material surrounding the path towards the well bottom part.

15 Claims, 1 Drawing Sheet

(51) Int. Cl.
    *F24T 10/13*     (2018.01)
    *F28D 15/02*     (2006.01)
    *F24T 10/00*     (2018.01)
(58) Field of Classification Search
    USPC ............................................ 60/641.1–641.6
    See application file for complete search history.

(56) References Cited

FOREIGN PATENT DOCUMENTS

WO      2009151649 A2    12/2009
WO      2016033071 A1     3/2016

OTHER PUBLICATIONS

International Search Report dated Jan. 17, 2018, issued in corresponding International Application No. PCT/EP2017/061052 filed May 9, 2017, 5 pages.

Written Opinion of the International Searching Authority dated Jan. 17, 2018, issued in corresponding International Application No. PCT/EP2017/061052 filed May 9, 2017, 9 pages.

International Search Report dated Jul. 9, 2018, issued in corresponding International Application No. PCT/EP2018/062125 filed May 9, 2018, 4 pages.

Written Opinion of the International Searching Authority dated Jul. 9, 2018, issued in corresponding International Application No. PCT/EP2018/062125 filed May 9, 2018, 9 pages.

2nd Written Opinion of the International Searching Authority dated Apr. 2, 2019, issued in corresponding International Application No. PCT/EP2018/062125 filed May 9, 2018, 5 pages.

Response to the 2nd Written Opinion of the International Searching Authority dated Jul. 2, 2019, issued in corresponding International Application No. PCT/EP2018/062125 filed May 9, 2018, 4 pages.

* cited by examiner

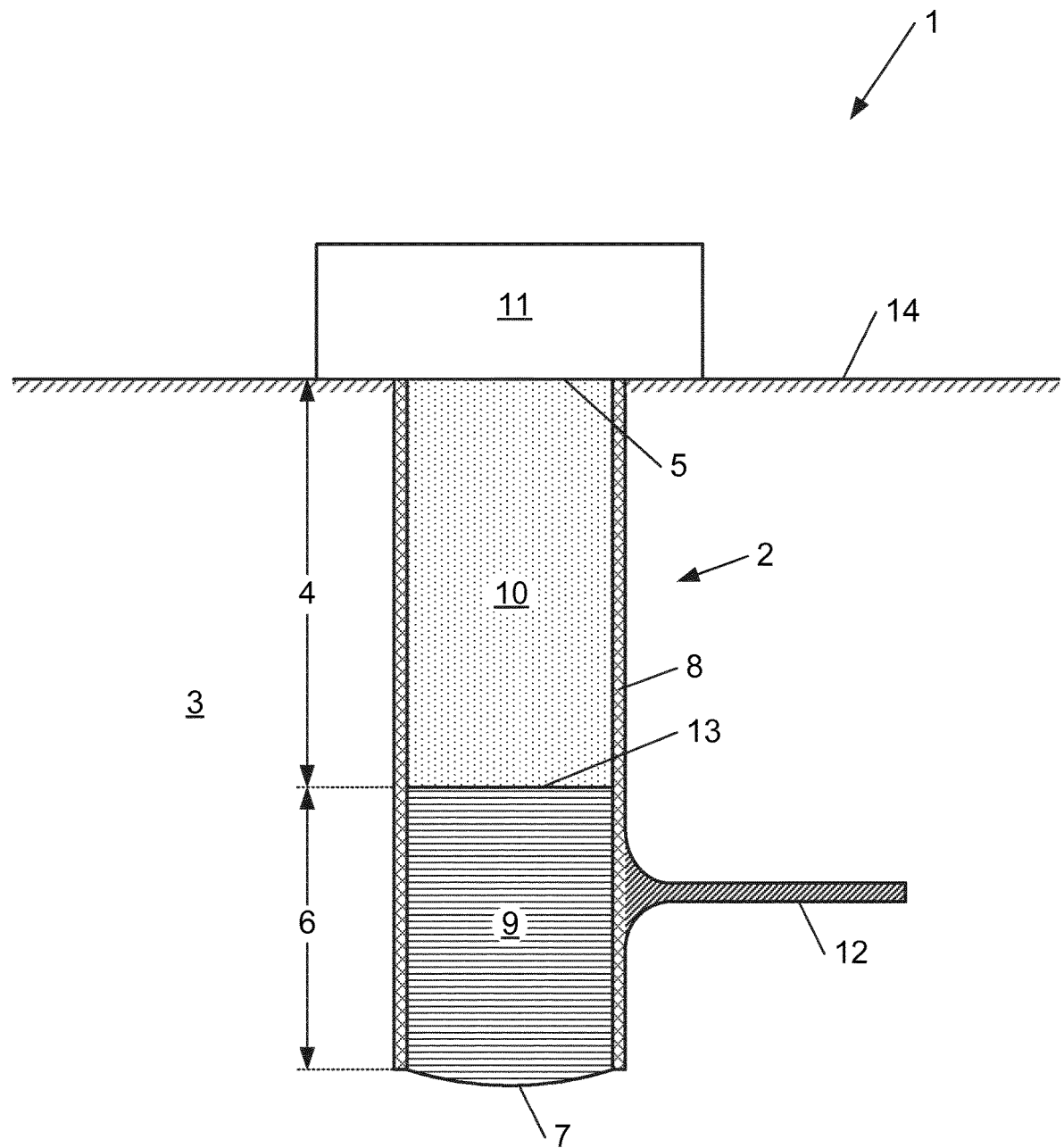

EFFICIENT GEOTHERMAL HEAT ENERGY EXTRACTION SYSTEM

BACKGROUND OF THE INVENTION

The present invention relates to the extraction of geothermal energy from earth material such as earth crust material, more particularly to the efficient recovery of geothermal energy from earth material.

The rapidly diminishing sources of fossil fuels, combined with the polluting effects of the energy source as well as of alternatives such as nuclear energy sources, has resulted in a number of prior art attempts to convert the heat available in the earth material to alternative energy such as electrical energy. Some prior art approaches require multiple wells to be drilled in the earth material for example enhanced geothermal systems (EGS) where an injection well is provided, configured to pump a fluid such as water into the earth material where it heats up and wherefrom it is subsequently retrieved through a production well provided at some distance from the injection well. Such approaches faced many different problems such as an increased geothermal pollution due to the creation of caustic water when traveling through the hot earth material from the injection well to the production well during which the water picks up minerals, salt and acidity; and such as an increased land subsidence due for example to the fracturing of earth material such as rock to create a passage from the injection well to the production well. Therefore, it is a common trend to use partly isolated single well geothermal heat extraction systems, which do not face the problems of for example EGS systems.

Many single well heat extraction systems provide a looped system within the partly isolated single well such as a looped system comprising an input tube for transporting heating fluid such as water to the non-isolated bottom of the well where the heating fluid heats up and an output tube for retrieving the heated working fluid. In such looped single well geothermal energy extraction systems a pumping mechanism is required, said pumping mechanism configured for controlling the heating fluid flow rate through the looped system and further configured for assuring an ordered circulation of the heating fluid through the looped system i.e. in one direction from the input tube to the output tube. These looped single well geothermal energy extraction systems, relying on active transportation of the heating fluid through the pumping of the heating fluid are highly inefficient.

Therefore, passive single well geothermal heat extraction systems according to the preamble of the first claim of the present invention, have been provided in the prior art such as disclosed in patent publication U.S. Pat. No. 3,911,683. Although these passive single well geothermal heat extraction systems tend to have in certain situations an increased efficiency with respect to the looped single well geothermal heat extraction systems in terms of energy output with respect to energy input, these systems, much as other single well heat extraction systems and in contrast to for example EGS systems, are confronted with a lack of available heat in the earth material as the heat available in the relatively small area around the single well is being depleted rather quickly, thus limiting the efficiency for example on the long term of the geothermal heat extraction system. Furthermore, as the efficiency of heat transfer depends on the contact area between the heat fluid and the heat source, for example the surrounding earth material, the efficiency of the single well applications is rather limited with respect to other systems such as EGS systems where the heat fluid is dispersed in the surrounding earth material travelling from the injection well to the production well.

It is known however from the prior art, for example from US20150013981, how to efficiently drill multiple short-length, medium radius lateral holes from a vertical well shaft such as a single well from a closed loop single well geothermal heat energy extraction system in order to increase efficiency of the closed loop systems. The prior art however is only concerned with non-efficient closed loop single well geothermal heat energy extraction systems i.e. active heat energy extraction systems.

It is therefore an object of the present invention to provide a passive single well heat extraction system with increased long term efficiency i.e. longevity.

SUMMARY OF THE INVENTION

In accordance with the present invention a system for extracting geothermal heat energy is provided, the system comprising a geothermal well, such as a single geothermal well, in surrounding crust material, the geothermal well extending in a first direction for example mainly along the gravitational acceleration vector such as along the gravitational acceleration vector, from a well top part starting at a well top level at the crust material surface down to a well bottom part more distant from the crust material surface, the well bottom part being at a depth where the surrounding crust material has geothermal temperatures elevated above temperatures at the crust material surface ending at a well bottom level at the bottom of the well. The geothermal well comprises a geothermal well wall delimiting the geothermal well from the surrounding crust material for example by a small layer of surrounding crust material or for example a reinforced wall providing structural stability to the geothermal well. The geothermal well further comprises a heat medium for example configured for being heated by the surrounding crust material, contained within the geothermal well walls for example not dispersed into the surrounding crust material such as in EGS systems. The heat medium is being heated at the well bottom part by heat extracted from the surrounding crust material, causing it to decrease in density, for example due to evaporation, and rise for example mainly along the first direction, carrying heat energy, for example passively without consuming energy for the transport, towards the well top part. The system further comprises a heat extractor, extracting the heat energy available at the well top part for example at least partly carried by the heat medium. The system is characterized in that at least one heat conductive path is provided in the surrounding crust material, the heat conductive path extending outwardly from the geothermal well into the crust material to conduct geothermal heat, for example passively without consuming energy for the transport, from the crust material surrounding the path towards the well bottom part.

Providing the system with the features as disclosed above generates the advantage of having to implement the systems once, after which geothermal heat energy will be extracted passively thus efficiently, for example without having to use energy for example to transport the heat from the surrounding crust material to the well bottom part through natural heat conduction via at least one heat conductive path or for example to transport the heated heat medium by natural convection from the well bottom part to the well top part. More specifically, the passive, thus efficient, extracting of geothermal heat energy will be an efficient process for a longer time with respect to existing systems in the prior art as mentioned before, due to the enlarged area surrounding the geothermal well formed by the extending heat conductive paths, wherefrom heat will be extracted. The extraction of the geothermal heat energy from the surrounding crust material of the single geothermal well depends among other things on the contact surface area between the geothermal well and the surrounding crust material, for example largely determined by the surface area of the geothermal well wall, for example entirely determined by the geothermal well wall in the prior art single well geothermal heat extracting systems as mentioned earlier. The present invention solves the problem of efficiency present in the prior art systems by providing a heat conductive path in the crust material surrounding the geothermal well extending outwardly from the geothermal well into the crust material to conduct geothermal heat from the crust material surrounding the path towards the well bottom part, thereby increasing the contact surface area between the heat conductive materials such as the heat conductive path and the heat medium on the one hand, and the surrounding crust material on the other hand. Furthermore, as the heat conductive path extends away, i.e. outwardly from the geothermal well, the conductive path is reaching towards areas of crust material outside of the depletion zone, i.e. the zone of crust material in close vicinity from the single geothermal well more depleted from geothermal heat energy after a long term of heat harnessing than zones far away from the geothermal well, thus reaching zones less affected by the depletion and thus improving the long term efficiency i.e. longevity of the system.

According to embodiments of the present invention, the system for extracting geothermal heat energy comprises at least one passive single well. The system for extracting geothermal heat energy of the present invention therefore comprises one or more single wells wherein heat energy is passively extracted from the environment, that is, without comprising pumps for pumping the heat medium within the single well. The passive single well heat extraction system relies on passive transportation of energy on the one hand from the surrounding crust material to the heat medium for example by heat conduction and on the other hand from the heat medium up to the heat extractor for example by heat convection. Each of the single wells in the system is independent, that is, one given first single well does not function as a heat medium entry while another second single well, at a remote location from the first single well, functions as a heat medium exit, as would be the case in EGS systems where one well operates as an injection well and another well operates as a production well. Providing independent wells alleviates the need of pumping heat medium from one well trough earth crust material to another well, a process which is energy consuming and which deteriorates earth crust conditions for example by fracturing earth crust material and by creating caustic water.

It has been found that, apart from having low energy consumption requirements, a passive single well according to the present invention can easily be designed such as to obtain a long usage time. The passive extraction of energy via the passive single well tends to extract energy from the environment at a lower rate than an active single well system, thereby creating a steady state situation, i.e. a steady state, a situation occurring at a certain time after the initialization of the system wherein the flux at which heat is harnessed, i.e. depleted from the crust material surrounding the well bottom part, i.e. the depleted zone, through the natural conduction of the geothermal heat from the crust material towards the heat medium comprised within the well bottom part, equals the heat flux at which the depleted zone is replenished for example through the generation of heat energy or through the conduction of heat energy from crust material further away from the geothermal well with respect to the depleted zone.

According to embodiments of the present invention, the heat extractor extracts the heat energy available at the well top part carried by the heat medium, preferably passively carried by the heat medium.

According to embodiments of the present invention, the heat medium comprised within the geothermal well walls, comprises a liquid phase and a gas phase.

According to embodiments of the present invention, the heat medium comprised within the geothermal well walls, comprises a radioactive heat medium such as radioactive waste material. It has been found that such radioactive waste material further adds thermic energy to the heat medium allowing, for example, to decrease the depth of the geothermal well.

The existence of the two phases of the heat medium in the system enables to simultaneously optimize on the one hand the harnessing of the geothermal heat energy from the surrounding crust material as the heat conductivity of a liquid medium is as a general rule higher than the heat conductivity of a gaseous medium, for example the thermal conductivity of liquid water being higher than the thermal conductivity of steam, thus improving the conduction of heat energy from the surrounding crust material to the heat medium and on the other hand the transportation of the thermal energy from the well bottom part to the well top part as a gaseous medium enables passive transport of heat energy through natural convection of the heat medium from the well bottom part to the well top part for example with less flow resistance than a heat medium in liquid phase.

According to embodiments of the present invention, the geothermal well is filled with the liquid phase heat medium up to a liquid-gas interface level at a depth where the surrounding crust material has geothermal temperatures elevated above temperatures at the crust material surface.

The geothermal well filled with the liquid phase heat medium up to a liquid-gas interface level at a depth where the surrounding crust material has geothermal temperatures elevated above temperatures at the crust material surface has the advantage of enabling the liquid heat medium to extract geothermal heat energy from the surrounding crust material by changing phase for example from liquid to gaseous phase and of enabling the extracted geothermal heat energy to be transported for example through natural convection of the heat medium to the well top part where it can be used by the heat extractor.

According to embodiments of the present invention, the well top part extends between the well top level and the liquid-gas interface and wherein the well bottom part extends between the liquid-gas interface and the well bottom level.

The two clearly distinguished parts of the geothermal well, the geothermal well bottom part and the well top part, each have at least one dedicated function for example respectively having the function of harnessing the geothermal heat energy of the surrounding crust material thereby heating the liquid phase heat medium and the function of hosting the gaseous phase heat medium thereby enabling the transportation of the thermal energy for example through natural convection of the heated gaseous heat medium along the first direction of the geothermal well towards the well top level. A further function of the well top part is the thermal loading of the crust material surrounding the well top part i.e. the delivery of heat energy to the crust material surrounding the well top part with the purpose of heating up such as increasing the temperature of the crust material surrounding the well top part such that the thermal gradient between the geothermal well top part and the crust material surrounding the well top part is reduced, thus reducing after a time period the heat flux from the geothermal well top part towards the crust material surrounding the well top part such that a steady state equilibrium situation is reached with a minimum of heat loss to the surrounding crust material of the well top part. In an alternative embodiment of the present invention, the heat conductivity of the geothermal well wall at the well top part is lower than the surrounding crust material such as to decrease leakage of heat into the surrounding crust material for example by providing an isolation layer as the geothermal well wall at the geothermal well top part. In the alternative embodiment the heat conductivity of the geothermal well wall at the well bottom part is higher than the heat conductivity of the surrounding crust material and the geothermal well wall at the well top part such as to increase the introduction of heat energy into the geothermal well through the geothermal well bottom part.

According to embodiments of the present invention, the geothermal well comprises a heat pipe i.e. functions as a heat pipe, the heat pipe extending in a first direction from a heat pipe top part starting at a heat pipe top level down to a heat pipe bottom part ending at a heat pipe bottom level, the heat pipe comprising a heat pipe wall delimiting the heat pipe from its surroundings and wherein the heat medium is contained within the heat pipe walls.

The heat pipe provided within the geothermal well, for example with the heat pipe wall adjacent to the geothermal well walls or for example with the heat pipe wall at least partly integrated with the geothermal well walls, has the advantage of being able to decouple the geothermal well and the component delimiting the heat medium for example the pipe for example the heat pipe. The decoupling of these two components allows to optimize features of both components, for example it allows to optimize the geothermal well with respect to structural integrity for example solidity or for example to provide isolation to the geothermal well top part and it allows to optimize the heat pipe for containing the heat medium for example by providing a heat pipe optimized for containing a heat medium and for transporting heat energy. Providing the heat pipe wall adjacent to the geothermal well walls or at least partly integrated with the geothermal well walls, allows for easily conducting the geothermal heat energy from the surrounding crust material to the heat medium and vice versa.

According to embodiments of the present invention, the heat pipe top part extends between the heat pipe top level and the liquid-gas interface and wherein the heat pipe bottom part extends between the liquid-gas interface and the heat pipe bottom level.

According to embodiments of the present invention the heat pipe consists of a sealed, for example closed hollow, pipe comprising an evaporator at the heat pipe bottom part and a condenser at a heat pipe part adjacent the heat pipe top level. The heat pipe walls are typically made of a material which comprise at least a heat conductive material at the heat pipe bottom part and at the heat pipe part adjacent the heat pipe top level. Typically, a vacuum pump is used to remove the air from the empty heat pipe prior to filling it with a heat medium. The heat pipe is subsequently partially filled with the heat medium and then sealed. The heat medium type and mass is chosen so that the heat pipe contains both a gas phase and a liquid phase over the operating temperature range. The liquid phase will vaporize upon extraction of energy from the surrounding crust material and travels to the condenser side adjacent the heat pipe top level, where it is cooled and turned back to a liquid phase. In a standard heat pipe, the condensed liquid is returned to the evaporator at the heat pipe bottom part using a wick structure provided along the heat pipe sidewalls exerting a capillary action on the liquid phase of the heat medium. Alternatively, the heat pipe can be designed as a thermosyphon where the condensed liquid is returned to the evaporator using gravity. As a general advantage, heat pipes contain no mechanical moving parts and thus require little maintenance, nor do they require energy consumption for the transportation of the thermal energy for example by actuation of a pump According to embodiments of the present invention the geothermal well wall is part of the heat pipe wall.

The system wherein the geothermal well wall is part of the heat pipe wall, such that the geothermal well wall and the heat pipe wall are one, has the advantage of having the functions of delimiting the geothermal well from the surrounding crust material and of containing the heat medium integrated within the same wall.

According to embodiments of the present invention, the heat pipe bottom level lies higher than or substantially adjacent to the well bottom level. Providing the heat pipe bottom level adjacent to the well bottom level optimizes the space available in the well.

According to embodiments of the present invention, the heat pipe wall extends from the heat pipe bottom level for example at the well bottom level up to a heat pipe top level at at least the well top level.

Allowing the heat pipe to extend from the well bottom level up to at least the well top level has the advantage of maximizing the length of the heat pipe within the geothermal well, thus maximizing the contact surface area of the heat pipe with the surrounding crust material.

According to embodiments of the present invention the heat pipe wall surpasses the well top level. In a preferred embodiment of the present invention, a heat pipe top part is provided extending between the heat pipe top level and the liquid-gas interface. In a preferred embodiment of the present invention the heat energy carried by the heat medium available at the well top part is further carried towards the heat pipe top part by the heat medium.

The advantage of the heat pipe wall surpassing the well top level is that the heat energy contained and transported by the heat medium from the well bottom part towards the well top part can further be transported to a level surpassing the well top level, thus enabling the heat extractor to access the heat energy more easily such as at a level surpassing the well top level, i.e. the crust material surface level.

According to alternative embodiments of the present invention the heat pipe wall extends from a heat pipe bottom level for example at the well bottom level up to a heat pipe top level below the well top level for example up to half of the depth of the well.

Providing a heat pipe up to a heat pipe top level substantially below the well top level, enables to extract thermal energy from the crust material surrounding the well/heat pipe bottom part and deliver the extracted energy via the heat pipe to the crust material surrounding the heat pipe top part adjacent the heat pipe top level. Under influence of the delivered heat, the surrounding crust material tends to release gasses in the crust material such as methane gas, commonly known as mine-gas. Without being bound by a theory, these gasses are produced by bacteria residing in water, for example mine-water, at an accelerated rate under the influence of the increased temperature. Furthermore, the heat delivered by the heat pipe increases the temperature of the water residing in the surrounding crust material at the heat pipe top part, for example adjacent to the heat pipe top level, such that water vapor-pressure increases for example causes the water to boil creating water vapor. The water may be naturally occurring water present in the surrounding curst material and/or water that has been artificially added in the well. Furthermore, the water is not bound to reside in the surrounding crust material but can also reside within the well on top of, for example surrounding, the heat pipe top part by preference above the heat pipe top level. The released gas such as the mine-gas for example along with the water vapor, for example entrained by the water vapor, is passively carried, for example trough convection, towards the well top part, by preference towards the well top level. The heat extractor can for example be configured as a set of electricity generating turbines arranged within the well top part for example above the heat pipe top level and/or at the well top level, wherein the turbines are driven by the kinetic energy of the passively rising gasses such as the mine gas for example the methane gas and such as the water vapor. Additionally or alternatively, the heat extractor can be configured for burning the liberated gasses such as the mine gas in order to generate electrical energy. Both the kinetic energy of the rising gases as the released heat of burning the gasses is considered as heat energy available at the well top part which can be used by the heat extractor for generating electrical energy or for directly using the heat of the gasses to heat a heating system.

In an embodiment of the present invention, the heat pipe top level can be adjusted, for example by providing an extendable heat pipe. The present embodiment has the advantage that the heat pipe can be extended from a heat pipe top level near the well bottom to a heat pipe top level at at least the well top level, for example to harvest gasses such as methane gas in the surrounding crust material at every position of the well. After all the gas has been harvested, for example due to the evaporation of the water in the surrounding crust material, the heat pipe top level is at at least the well top level, where the system continuous to extract heat energy from the well bottom part via the heat extractor.

In an embodiment of the present invention, the heat pipe is provided in an existing well such as an abandoned mining shaft. This embodiment has the advantage that the cost associated to drilling the well can be avoided. In an embodiment of the present invention, the heat pipe is provided in a new well which is dug in an existing well such as an abandoned mining shaft. This embodiment has the advantage that the cost associated to drilling the well can be partly avoided.

According to embodiments of the present invention the heat pipe wall is made out of a first heat conductive material. According to preferred embodiments of the present invention the first heat conductive material has a heat conductivity rate higher than 30 W/(m·K), preferably higher than 100 W/(m·K).

Providing the heat pipe wall with a heat conductive material enables geothermal heat energy to be transferred from the surrounding crust material towards the heat medium and vice versa. The heat conductivity of at least 30 W/(m·K) proves to be suitable for many situations. By preference the heat pipe wall has a heat conductivity of at least 100 W/(m·K) proving to be most suitable for many situations.

According to embodiments of the present invention the well bottom part is a heat harnessing component. In a preferred embodiment of the present invention the heat harnessing component is configured for exchanging heat between the surrounding crust material of the heat harnessing component and the heat medium comprised within the heat harnessing component. In order for the heat harnessing component to exchange heat between the surrounding crust material of the heat harnessing component and the heat medium the well wall functions as a heat exchanger, providing an enlarged contact surface area for increasing the heat influx into the heat medium. In preferred embodiments of the present invention, the well wall as well as the heat pipe wall or the well wall as part of the heat pipe wall, function as a heat exchanger by providing an enlarged contact surface area for increasing the heat influx into the heat medium.

According to embodiments of the present invention, the geothermal temperatures of the crust material surrounding the well bottom part are at least the boiling temperature of the heat medium, such as the liquid heat medium, at the pressure provided in the geothermal well or heat pipe bottom part. More specifically, the crust material surrounding the well bottom part adjacent the well wall of the well bottom part are comprised within a range of temperatures at least equal to the boiling temperature of the heat medium, such as the liquid heat medium, comprised within the walls of the well bottom such as the well walls or the heat pipe walls, at the time of initialization of the geothermal well i.e. initialization, at which the geothermal well is filled with liquid heat medium. According to a preferred embodiment of the present invention, the crust material surrounding the well bottom part adjacent the well wall of the well bottom part are comprised within a range of temperatures at least equal to the boiling temperature of the heat medium, such as the liquid heat medium, comprised within the walls of the well bottom such as the well walls or the heat pipe walls, after the instauration of a steady state situation, i.e. at steady state, a situation occurring at a certain time after the initialisation of the system wherein the flux at which heat is harnessed, i.e. depleted from the crust material surrounding the well bottom part, i.e. the depleted zone, through the natural conduction of the geothermal heat from the crust material towards the heat medium comprised within the well bottom part, equals the heat flux at which the depleted zone is replenished for example through the generation of heat energy or through the conduction of heat energy from crust material further away from the geothermal well with respect to the depleted zone. The provision of the at least one heat conductive path has been shown to be of primordial importance in order to provide such an equilibrium.

According to embodiments of the present invention the at least one heat conductive path is extending outwardly from the geothermal well wall into the crust material surrounding the geothermal well wall.

The system with at least one heat conductive path extending outwardly from the geothermal well wall into the crust material surrounding the geothermal well wall has the advantage that the geothermal heat from crust material at a certain distance from the geothermal well can be extracted. The embodiment is particularly advantageous in situations where the well wall from which the at least one heat conductive path branches, contains the liquid phase heat medium, i.e. is adjacent to the heat medium, i.e. is in direct contact with the liquid phase heat medium, thus in situations where there is no heat pipe provided in the geothermal well or in situations where the geothermal well wall is part of the heat pipe wall.

According to embodiments of the present invention the at least one heat conductive path is extending outwardly from the heat pipe wall into the crust material.

The system with at least one heat conductive path extending outwardly from the heat pipe wall into the crust material surrounding the geothermal well wall has the advantage that the geothermal heat from crust material at a certain distance from the geothermal well can be harvested. The embodiment is particularly advantageous in situations wherein the geothermal well wall is not part of the heat pipe wall, for example in situations wherein the geothermal well wall is optimized with respect to structural integrity but lacks good thermal conductive properties, as in those situations the at least one conductive path can be provided to extend outwardly from the heat pipe wall through the geothermal well wall and into the crust material surrounding the geothermal well wall.

According to embodiments of the present invention the at least one heat conductive path is extending outwardly from the geothermal well bottom part into the crust material surrounding the geothermal well bottom part.

The system with at least one heat conductive path extending outwardly from the geothermal well bottom part into the crust material surrounding the geothermal well bottom part has the advantage that the geothermal heat from crust material at a certain distance from the geothermal well can be harvested and conducted towards the liquid heat medium comprised within the geothermal well bottom part.

According to embodiments of the present invention the at least one heat conductive path is a naturally occurring layer in the surrounding crust material, the naturally occurring layer having a thermal conductivity higher than 30 W/(m·K).

The system with at least one heat conductive path being a naturally occurring layer in the surrounding crust material has the advantage that the conductive path can reach far out from the geothermal well thus harnessing geothermal energy from remotely located crust material with respect to the geothermal well. Naturally occurring layers having a thermal conductivity higher than 30 W/(m·K) have the advantage of efficiently conducting the geothermal heat energy with respect to the transport occurring through the crust material surrounding the geothermal well with lower thermal conductivity values.

According to embodiments of the present invention the at least one heat conductive path is a path created, for example drilled, into the surrounding crust material and filled with a second heat conductive material.

The system wherein the at least one heat conductive path is a path created, for example drilled, into the surrounding crust material and filled with a second heat conductive material has the advantage of not being depended on the location where the geothermal well is being placed as the geothermal well does not have to be placed for example on a location where the crust material comprises naturally occurring layers of material with a thermal conductivity higher than 30 W/(m·K). Furthermore, the heat conductive paths can be provided in any shape and dimension. A preferred embodiment of the present invention is a system wherein the at least one heat conductive path is a drilled branch in the surrounding crust material for example extending a certain length for example 10 meters in one direction outwardly from the geothermal well for example under an angle with respect to the plane of the crust material surface for example in the plane of the crust material surface at any position within the geothermal well bottom part. A further embodiment of the present invention is a system wherein the at least one heat conductive path is a drilled disk in the surrounding crust material i.e. a disk centered around the geothermal well with radius 10 meters for example under an angle with respect to the plane of the crust material surface for example in the plane of the crust material surface at any position within the geothermal well bottom part. A further embodiment of the present invention is a system wherein the heat conductive path are two drilled branches in the surrounding crust material for example extending a certain length for example 10 meters in two different directions for example in the same plane under 180°, outwardly from the geothermal well.

According to embodiments of the present invention, the at least one heat conductive path is a network of veins created, for example by fracking, in the surrounding crust material, in case of fracking for example through application of high pressurized liquid, in the geothermal well. Advantageously the network of veins constituting the at least one heat conductive path is created through application of liquid second heat conductive material, for example under pressure, for example in order to frack the surrounding crust material.

The at least one heat conductive path, for example formed through fracking of the surrounding crust material, has the advantage that a vast network of veins is created in the surrounding crust material, wherein the network of veins has a high surface-to-volume ratio with respect to a heat conductive path being created as a drilled cylinder of the same volume. Such high surface-to volume ratio increases the efficiency with which thermal energy can be harvested by the heat conductive path.

According to embodiments of the present invention, the at least one heat conductive path is for example a naturally occurring network of veins in the surrounding crust material, which is filled with the second heat conductive material.

The at least one heat conductive path being provided as a naturally occurring network of veins in the surrounding crust material, which is filled with the second heat conductive material, has the advantage that no additional time and energy have to be invested in creating the network of veins.

According to embodiments of the present invention, the at least one heat conductive path, for example a network of veins or a drilled branch which are subsequently filled with a second heat conductive material, is structurally stabilized by the second heat conductive material. The second heat conductive material fills the hole for example created as a drilled branch or as a network of veins created through fracking, thereby alleviating the risk that the hole collapsed. By filling the holes the risk of land subsidence is greatly alleviated.

According to embodiments of the present invention, the second heat conductive material residing in the heat conductive branch is a liquid.

According to embodiments of the present invention, the second heat conductive material residing in the heat conductive branch is a solid.

According to embodiments of the present invention, the heat transfer from the crust material surrounding the heat conductive path to the heat medium comprised within the geothermal well is performed substantially, for example solely, by means of heat conduction, for example without any heat convection taking place within the heat conductive path, i.e. the second heat conductive material residing in the heat conductive path is not subjected to mass transport.

According to embodiments of the present invention the second heat conductive material has a thermal conductivity of at least 30 W/(m·K). According to embodiments of the present invention the second heat conductive material comprises at least one of carbon, beryllium, sodium, magnesium, aluminum, silicon, potassium, calcium, iron, chromium, nickel, cobalt, copper, zinc, molybdenum, ruthenium, rhodium, silver, cadmium, tungsten, iridium and gold. The second heat conductive material preferably occurs naturally in the surrounding crust material, for example is a naturally occurring ore layer in the surrounding crust material.

Embodiments wherein the second heat conductive material is one of the above, has the advantage that a good thermal conductivity is obtained. By preference one of sodium, potassium and calcium is used as these materials have a relatively low melting point for example a melting point below 200° C. such as around 100° C., causing them to melt at the geothermal temperatures at the well bottom, having the advantage that the melted materials easily penetrate the created, for example drilled, path in order to create the heat conductive path.

According to embodiments of the present invention, the at least one heat conductive path, for example the veins, is created through application of the second heat conductive material in liquid phase in the well bottom part for example after drilling and/or fracking the path in the surrounding crust material.

The application of the second heat conductive material in liquid phase in the well bottom part is that the efficiency of for example the fracking process is increased as a liquid second heat conductive material more easily creates and penetrates veins in the surrounding crust material than solid second heat conductive material. Furthermore, the application of liquid second heat conductive material in the well bottom part enables to more easily fill the at least one created for example drilled heat conductive path with respect to filling with solid phase second heat conductive material, because during filling of the heat conductive path the liquid second heat conductive material easily flows into the at least one created for example drilled path thus correctly filling the created for example drilled path.

According to embodiments of the present invention the heat extractor in operation uses thermal energy available at the heat pipe top part carried, for example passively, by the heat medium.

The system wherein the heat extractor in operation uses thermal energy available at the heat pipe top part carried, for example passively, by the heat medium has the advantage that the heat extractor can be placed above the geothermal well top level, thus above the crust material surface level. This enables to use installation above ground, which are easier to implement for example since a heat extractor for generating geothermal energy needs a cold side for condensing the gaseous heat medium which is difficult to implement underground for example due to the elevated geothermal temperatures underground. On the cold side for example a chimney or cooling tower could be provided which could also further harvest energy, for example electrical energy, by capturing the energy of the naturally occurring air flow of heated air, for example with by providing a wind turbine in the path of the heated air flow. Such capturing of energy further improves the overall efficiency of generation of energy by converting heat to electrical energy. As the heat is being extracted from the gaseous heat medium at the heat extractor, the heat medium loses thermal energy causing its temperature to drop and for example to release latent energy by changing its phase for example from gaseous to liquid. The change of phase for example causes the density of the heat medium to decrease, due to which the heat medium tends to fall back to the well bottom part under the action of gravity. In order to minimize entrainment of the heat medium falling back to the well bottom part, or to alleviate the need of a wick structure in the heat pipe or in embodiments where the gaseous heat medium is allowed to escape the heat pipe or geothermal well, an embodiment of the present invention provides the replenishment of heat medium in the heat pipe or geothermal well for example by replenishing the heat pipe or geothermal well with liquid heat medium. Furthermore, a wick structure could be provided along the sidewalls of the heat pipe in order to assist the return of heat medium to the well bottom part. The heat medium in such an embodiment will rise centrally in the heat pipe and will fall back via the sidewalls of the heat pipe for example by means of capillary action through the wick and/or by means of gravitational pull.

According to embodiments of the present invention the heat extractor comprises a converter for converting the heat energy into electrical energy. For example, the heat extractor thereto can comprise a turbine, a thermionic generator or other known electric generators which can convert the available thermal energy into electrical energy. In the embodiment the heat extractor comprises a usable heat circuit comprising a second heat medium for example different from the heat medium comprised in the geothermal well which is the first heat medium, for example in a gaseous phase such as steam. According to an embodiment of the present invention the second heat medium in gaseous phase drives a turbine such as a steam turbine for example to generate electricity. According to embodiments of the present invention the heat extractor comprises a chimney for example provided with the heated usable heat circuit at the bottom of the chimney, configured for extracting thermal energy from the heated usable heat circuit for example by providing windmills in the chimney which generate electrical energy due to the natural draft created in the chimney caused by the heated usable heat circuit heating air at the bottom of the chimney. According to embodiments of the present invention thermal energy is converted to electrical energy by extracting thermal energy from the heated usable heat circuit sequentially by the steam turbine and by the chimney.

The system comprising a heat extractor comprising a usable heat circuit comprising a second heat medium in a gaseous phase wherein the second heat medium in gaseous phase drives a turbine for example to generate electricity has the advantage of generating environmental friendly electrical power. The system wherein the thermal energy is converted to electrical energy sequentially by the steam turbine and by the chimney has the advantage that the thermal energy comprised in the heated usable heat circuit is optimally extracted i.e. a larger percentage of the heat comprised in the usable heat circuit is used, thus enhancing the heat to electricity conversion ratio.

According to embodiments of the present invention the heat extractor comprises a usable heat circuit comprising a second heat medium such as water or steam wherein the usable heat circuit comprised within the heat extractor is configured for heating a heating system. More specifically, the usable heat circuit comprised within the heat extractor is configured for directly using the heat of the heated second heat medium comprised within the usable heat circuit, for example configured for directly heating for example a surface for example an ice covered road or a house floor or for example configured for enhancing an endothermic chemical process such as the cleaning of carbon dioxide absorbers after absorption of carbon dioxide in the carbon dioxide absorber. To such end the usable heat circuit is provided adjacently to the surface requiring to be heated. According to embodiments of the present invention, the heat extractor is configured for sequentially converting thermal energy comprised in the heated usable heat circuit to electrical energy and for directly using the thermal energy comprised in the heated usable heat circuit.

The system comprising a heat extractor comprising a usable heat circuit comprising a second heat medium wherein the usable heat circuit comprised within the heat extractor is configured for directly using the heat of the heated second heat medium comprised within the usable heat circuit has the advantage of providing an environmental friendly heating system. The heat extractor comprising a carbon dioxide absorber using the heat from the heated usable heat circuit has the advantage of absorbing carbon dioxide from the atmosphere in an environment friendly manner i.e. without having to generate the heat required for the endothermic cleaning of the carbon dioxide absorber using environment polluting means such as classical burning of fossil fuels. The system configured for sequentially converting thermal energy comprised in the heated usable heat circuit to electrical energy and for directly using the thermal energy comprised in the heated usable heat circuit has the advantage that the thermal energy comprised in the heated usable heat circuit is optimally extracted i.e. a larger percentage of the heat comprised in the usable heat circuit is used.

According to embodiments of the present invention the heat extractor comprises a heat exchanger to indirectly heat the usable heat circuit with heat available in the well top part. According to embodiments of the present invention the heat extractor comprises a heat exchanger to indirectly heat the usable heat circuit with heat available in the heat pipe top part. The heat exchanger could for example be an intertwining of on the one hand one of the heat pipe top part and the well top part and on the other hand the usable heat circuit. In embodiments where the second heat medium comprised within the usable heat circuit and heated through a heat exchanger according to the present embodiment, needs to be in a gaseous phase, the transformation of the second heat medium can for example be assisted by providing a flash turbine comprised within the heat extractor, wherein the flash turbine uses the heated second heat medium such as heated water, to generate a gaseous phase of the second heat medium such as steam in order to drive the turbine for example to generate electricity. In alternative embodiments of the present invention, the usable heat circuit is connected to one of the geothermal well and the heat pipe such that the second heat medium is the first heat medium.

The system wherein the heat extractor comprises a heat exchanger to indirectly heat the usable heat circuit with heat available in one of the well top part and the heat pipe top part, has the advantage of decoupling the usable heat circuit comprised within the heat exchanger and one of the heat pipe top part and the well top part. The decoupling of the two components allows to isolate one of the geothermal well and the heat pipe with respect to the usable heat circuit, thus containing the first heat medium within respectively the geothermal well and the heat pipe. This embodiment is particularly advantageous when the first heat medium is a dangerous medium, such as a toxic medium or a radioactive medium, for which isolation with the second heat medium of the usable heat circuit is advised.

According to embodiments of the present invention, at least two heat pipes are provided within the geothermal well. More specifically, at least a first heat pipe comprising the first heat pipe heat medium is provided with the first heat pipe bottom level adjacent the geothermal well bottom level, and a second heat pipe comprising another heat medium, the second heat pipe heat medium, is provided with the second heat pipe top level at at least the geothermal well top level such that the top of the first heat pipe, the first heat pipe top level, and the bottom of the second heat pipe, the second heat pipe bottom level are configured to indirectly exchange heat, for example by the second heat pipe bottom level being adjacent to the first heat pipe top level or by intertwining the first heat pipe top part with the second heat pipe bottom part. In an embodiment of the present invention, the first heat pipe heat medium provided in the first heat pipe is a radioactive heat medium such as radioactive waste material which provides additional thermal energy to the second heat pipe heat medium comprised in the second heat pipe, for example allowing the depth to be more limited than without the radioactive heat medium. In this embodiment the heat pipe wall material of the first heat pipe wall and the second heat pipe wall are different. The heat pipe wall material of the second heat pipe wall is the first heat conductive material and the heat pipe wall material of the first heat pipe wall delimiting the radioactive first heat pipe heat medium is made out of a radioactive radiation resistant material. The radioactive radiation resistant material is preferably resistant to typical temperatures of radioactive heat medium material, which depend on the type of radioactive waste material used.

The system wherein at least two heat pipes are provided within the geothermal well has the advantage of decoupling the two heat pipes which allows to isolate the two heat pipes, thus containing the first heat medium within the first heat pipe. This embodiment is particularly advantageous when the first heat medium is a dangerous medium, such as a toxic medium or a radioactive medium, for which isolation with the other heat medium of the second heat pipe for example water, is advised.

According to embodiments of the present invention the geothermal well has a well depth between the well top level and the well bottom level which is determined by the level of crust material temperatures as a function of depth at the location of the geothermal well. As in general the temperature in the earth's crust rises in function of increasing depth, the deeper the geothermal well, the better. More specifically, the geothermal well depth is adapted such that at the time of initialization of the geothermal well the range of temperatures at the geothermal well bottom are at least the boiling temperature of the first heat medium. In a preferred embodiment of the present invention, the geothermal well depth is adapted such that at steady state the range of temperatures at the geothermal well bottom are at least the boiling temperature of the first heat medium at the pressure in the geothermal well. According to embodiments of the present invention, the well depth is between 1 and 6 kilometers for example at least 3 kilometers. For example, at such depths, such as for example at 6 km depth, temperatures of 200° C. can be reached offering conditions of improved energy conversion.

The system comprising a geothermal well with the geothermal well depth adapted such that at steady state the range of temperatures at the geothermal well bottom are at least the boiling temperature of the first heat medium has the advantage of enabling the first heat medium to boil, thus accelerating the formation of gaseous phase first heat medium which is optimal for the transport of the thermal energy towards one of the well top part and heat pipe top part.

According to embodiments of the present invention the geothermal well wall, preferably the well wall of the well bottom part, preferably the heat pipe bottom part, preferably including the heat conductive paths, has a surface area determined based on at least the heat transfer capacity that is required. More specifically, increasing the surface area of the geothermal well bottom part tends to increase the rate at which heat can be harnessed and transferred to the first heat medium up to a rate where one of the limits is attained regarding the replenishing rate of the crust material surrounding the well bottom part i.e. through the generation of heat energy and through the conduction of heat energy from crust material further away from the geothermal well with respect to the depleted zone in vicinity of the geothermal well, and regarding the first heat medium heat transfer capacity i.e. the rate at which the heat medium can transport the harnessed geothermal heat to one of the well top part and heat pipe top part. According to preferred embodiments of the present invention a cylindrical geothermal well is provided with a diameter of at least 10 cm. The determination of the dimensions of the geothermal well, heat pipe heat conductive path etc. strongly depends on at least the type of surrounding crust material, the temperature at a given depth in the surrounding crust material, the desired amount of energy transported to the surface, etc.

The present invention also relates to a method for producing the heat extraction system according to anyone of the preceding embodiments of the present invention, wherein the method comprises a set of steps. A first step comprises making, such as drilling, the geothermal well in the surrounding crust material from the well top level at the crust material surface down to the well bottom level at a depth where the surrounding crust material has geothermal temperatures elevated above temperatures at the crust material surface. A further step comprises filling the geothermal well at least partly with the heat medium such that the heat medium is contained within the geothermal well walls by the geothermal well walls. A further step comprises installing the heat extractor at the well top level.

The method for producing the heat extraction system has the advantage of providing a simple and fast way for implementing an energy efficient geothermal well, for example by implementing the geothermal well in an area where the crust material comprises natural layers of heat conductive material with a heat conductivity rate higher than 30 W/(m·K).

According to embodiments of the present invention the method for producing the heat extraction system further comprises the steps of making, such as drilling, at least one path extending from the geothermal well into the surrounding crust material, and filling the at least one path with the second heat conductive material. The method allows for producing an energy efficient heat extraction system without the need for example to create excessively deep and wide wells which are costly and time consuming to create.

The method for producing the heat extraction system according to the present embodiment has the advantage of providing a simple and fast way for implementing an energy efficient geothermal well, for example by implementing the geothermal well in an area where the crust material does not comprise natural layers of heat conductive material with a heat conductivity rate higher than 30 W/(m·K). The method allows for producing an energy efficient heat extraction system without the need for example to create excessively deep and wide wells which are costly and time consuming to create.

According to embodiments of the present invention the method for producing the heat extraction system further comprises the step of inserting the heat pipe into the geothermal well.

According to embodiments of the present invention the method for producing the heat extraction system further comprises the step of inserting the heat pipe into the geothermal well from a heat pipe bottom level at the well bottom level up to a heat pipe top level at at least the well top level. According to an embodiment of the present invention, the at least one path extends through the well wall and is connected to the heat pipe wall for example by welding the filled path to the heat pipe wall The method for producing the heat extraction system according to the present embodiment has the advantage of optimally producing a geothermal heat extraction system by concentrating on creating a structurally stable geothermal well without the need to worry about other aspect such as the permeability of the well wall with respect to the heat medium comprised within the geothermal well wall. Furthermore, the present embodiment allows to recuperate existing wells such as preceding drilled wells for example for oil digging or such as naturally occurring wells by for example merely integrating a heat pipe within the already existing well in the surrounding crust material, or by merely drilling at least one path and filling the at least one path before inserting the heat pipe in the geothermal well, thus being an economical production process.

The present invention also relates to a use of the heat extraction system according to anyone of the preceding embodiments related to the heat extraction system. More specifically, the present invention also relates to the use of the heat extraction system to extract heat from the surrounding crust material of the geothermal well.

The use of the heat extraction system allows the user to obtain environmental-friendly energy in an efficient, thus cost-friendly way.

According to embodiments of the present invention, the use of the heat extraction system comprises using the heat extractor which uses the heated heat medium to generate electricity.

The use of the heated medium in the heat extractor of the heat extraction system to generate electricity allows the user to obtain environmental-friendly electrical energy in an efficient, thus cost-friendly way According to embodiments of the present invention, the use of the heat extraction system comprises using the heat extractor which uses the heat exchanger to indirectly heat the usable heat circuit with heat available in the well top part. To that end a concentric tube heat exchanger can for example be used, where the heat extractor heat exchanger provides an outer tube surrounding the heat pipe or geothermal well top part such that heat is transferred between the outer tube, for example the usable heat circuit provided in the outer tube, and the heat pipe or geothermal well top part.

The indirect use of the heated heat medium allows the user to be isolated from the heated heat medium which can for example be toxic or radioactive.

DETAILED DESCRIPTION

Other details and advantages of the method of to the invention will become apparent from the enclosed figures and description of preferred embodiments of the invention.

FIG. 1 shows a cross-section side view of the geothermal heat extraction system.

The FIG. 1 shows an embodiment of a geothermal heat extraction system 1 comprising an heat extractor 11 and a geothermal well 2, said geothermal well being provided within the crust material 3.

The crust material 3 is a part of the earth above the earth mantle and can consist of many different types of soils and rocks. The crust material extends in the direction opposed the gravitational acceleration vector up to a crust material surface 14 at which level the geothermal well 2 reaches a geothermal well top level 5 and at which level the heat extractor 11 is positioned. The geothermal well 2 extends in a first direction along the gravitational acceleration vector, from a well top part 4 starting at a well top level 5 at the crust material surface 14 down to a well bottom part 6 more distant from the crust material surface 14, the well bottom part 6 being at a depth where the surrounding crust material 3 has geothermal temperatures elevated above temperatures at the crust material surface 14 ending at a well bottom level 7 at the bottom of the well 2. The geothermal well comprises a geothermal well wall 8 delimiting the geothermal well from the surrounding crust material 3 by a heat conductive reinforced wall providing structural stability to the geothermal well and functioning as a heat pipe where the heat pipe walls are the geothermal well walls 8 and a heat pipe top part and a heat pipe bottom part are respectively the geothermal well top part 4 and geothermal well bottom part 6. Preferably, the heat conductivity of the top part 4 is lower than the surrounding crust material such as to decrease leakage of heat into the surrounding crust material for example by providing an isolation layer on the top part 4 of the geothermal well (not shown on the figure). Preferably, the heat conductivity of the geothermal well bottom part 6 is higher than the surrounding crust material such as to increase the introduction of heat energy into the geothermal well. The geothermal well 2 further comprises a heat medium such as water 9,10 configured for being heated by the surrounding crust material 3, contained within the geothermal well walls 8. The heat medium 9,10 comprised within the geothermal well walls 8 comprises a liquid phase 9 and a gas phase 10 wherein the geothermal well 2 is filled with the liquid phase heat medium 9 up to a liquid-gas interface level 13 at a depth where the surrounding crust material 3 has geothermal temperatures elevated above temperatures at the crust material surface 14 and wherein the well top part 4 extends between the well top level 5 and the liquid-gas interface 13 and wherein the well bottom part 6 extends between the liquid-gas interface 13 and the well bottom level 7. The liquid phase heat medium 9 is being heated at the well bottom part 6 by heat extracted from the surrounding crust material 3, causing it to evaporate, and thus changing phase and absorbing energy, and subsequently rise mainly along the first direction, carrying heat energy, for example passively without consuming energy for the transport, towards the well top level 5 in the well top part 4. More specifically, heat energy is conducted from the crust material 3 toward the liquid heat medium 9 in the well bottom part 6 through the heat conductive heat pipe- and geothermal well wall 8. The conduction takes place due to the difference in temperature between the liquid heat medium 9 in the well bottom part 6 and the surrounding crust material 3 which crust material 3 is by preference at least equal to the boiling temperature of the liquid heat medium 9 at steady state i.e. the thermal equilibrium state that is created after a time period of heat extraction following initialization of the geothermal well by filling the well 2 with the heat medium 9. The heat pipe and geothermal well walls 8 at the geothermal well bottom part 6 function as a cooking plate for the liquid heat medium 9 which is made to boil, creating the gaseous phase heat medium 10. More specifically, as heat is added to the liquid heat medium 9 at steady state the amount of gaseous phase 10 will increase with respect to the amount of liquid phase 9. The liquid heat medium 9 will enter into different stadia at it rises along the first direction of the geothermal well 2: at first convective transport of the liquid heat medium 9 towards the well top part will take place, followed by a bubbly flow where bubbles form and rise due to their lower density and increased buoyance, a stadium called subcooled boiling, followed by a saturated nucleate boiling stadium where bubbles join in a slug flow, followed by an annular flow due to the gaseous heat medium 10 forcing the liquid heat medium 9 towards the geothermal well walls 8, followed by an annular flow with entrainment where the liquid heat medium 9 at the geothermal well wall 8 is reheated to the gaseous phase heat medium 10 and followed by a drop flow where the geothermal well walls 8 are cooled by heat losses of the geothermal well wall 8 at higher regions, resulting in formation of drops on the walls which drops gravitate towards the geothermal well bottom part 6. Preferably the heat pipe sidewalls 8 are provided with a wick provided along the heat pipe sidewalls enabling the return of the condensed heat medium 10 towards the well bottom part 6.

The system further comprises the heat extractor 11, extracting the heat energy available at the well top part 4 carried by the gaseous heat medium 10 for example by providing a heat extractor 11 at the well top level 5 to extract the energy towards a second useful heat circuit. The heat can be used for example to generate electricity.

The system is characterized in that at least one heat conductive path 12 is provided in the surrounding crust material 3, the heat conductive path extending outwardly from the heat pipe and geothermal well wall 8 into the crust material 3 to conduct geothermal heat, for example passively without consuming energy for the transport, from the crust material 3 surrounding the path 12 towards the well bottom part 6. The heat conductive path 12 is connected, for example welded, to the heat pipe and geothermal well wall 8 in order to maximize contact between the heat conductive path 12 and the heat pipe and geothermal well wall 8. For clarity purposes, the functioning of a heat pipe as used in the present invention will be explained. A typical heat pipe consists of a sealed pipe 8 comprising an evaporator at the heat pipe bottom part 6 and a condenser at a heat pipe part adjacent the heat pipe top level 5. The heat pipe walls 8 are typically made of a material which comprise at least a heat conductive material at the heat pipe bottom part 6 and at the heat pipe part adjacent the heat pipe top level 5. Typically, a vacuum pump is used to remove the air from the empty heat pipe prior to filling it with a heat medium 9,10. The heat pipe is subsequently partially filled with the heat medium 9,10 and then sealed. The heat medium 9,10 type and mass is chosen so that the heat pipe contains both a gas phase 10 and a liquid phase 9 over the operating temperature range. The saturated liquid phase 9 will vaporize upon extraction of energy from the surrounding crust material 3 and travels to the condenser side adjacent the heat pipe top level 5, where it is cooled and turned back to a saturated liquid phase 9. In a standard heat pipe, the condensed liquid 9 is returned to the evaporator at the heat pipe bottom part 9 using a wick structure provided along the heat pipe sidewalls exerting a capillary action on the liquid phase 10 of the heat medium. Alternatively, the heat pipe can be designed as a thermosyphon where the condensed liquid 9 is returned to the evaporator using gravity. As a general advantage, heat pipes contain no mechanical moving parts and thus require little maintenance, nor do they require energy consumption for the transportation of the thermal energy for example by actuation of a pump.

The invention claimed is:

1. A system for extracting geothermal heat energy comprising:
a passive geothermal well in surrounding crust material, the passive geothermal well extending in a first direction from a well top part starting at a well top level at the crust material surface down to a well bottom part more distant from the crust material surface ending at a well bottom level, the well bottom part being at a depth where the surrounding crust material has geothermal temperatures elevated above temperatures at the crust material surface, the geothermal well comprising a geothermal well wall delimiting the geothermal well from the surrounding crust material;
a heat pipe disposed within the passive geothermal well, the heat pipe extending in a first direction from a heat pipe top part starting at a heat pipe top level down to a heat pipe bottom part ending at a heat pipe bottom level, the heat pipe comprising a heat pipe wall delimiting the heat pipe from its surroundings and wherein the heat pipe further comprises a heat medium contained within the heat pipe walls, the heat medium being heated at the heat pipe bottom part by heat extracted from the surrounding crust material, decreasing in density and rising, passively carrying heat energy towards the heat pipe top level, wherein the heat pipe is provided with a wick along the heat pipe sidewalls, and wherein the heat pipe wall is made out of a first heat conductive material; and
a heat extractor configured to extract heat energy available at the well top part,
wherein at least one heat conductive path is provided in the surrounding crust material, the heat conductive path extending outwardly from the geothermal well into the crust material to conduct geothermal heat from the crust material surrounding the path towards the geothermal well bottom part, wherein the at least one heat conductive path is filled with a second heat conductive material, and wherein the second heat conductive material residing in the heat conductive branch is a solid.

2. The system for extracting geothermal heat according to claim 1, wherein the geothermal well wall is part of the heat pipe wall.

3. The system for extracting geothermal heat according to claim 1, wherein the at least one heat conductive path extends outwardly from the heat pipe wall into the crust material surrounding the geothermal well wall.

4. The system for extracting geothermal heat according to claim 1, wherein the first heat conductive material has a heat conductivity rate higher than 30 W/(m·K).

5. The system for extracting geothermal heat according to claim 1, wherein the at least one heat conductive path is a path drilled into the surrounding crust material and filled with a second heat conductive material, wherein the second heat conductive material has a heat conductivity rate of at least 30 (W/m·K).

6. The system for extracting geothermal heat according to claim 1, wherein the heat pipe wall extends from the heat pipe bottom level up to a heat pipe top level below the well top level, whereby gas is released from the crust material and passively carried towards the well top part.

7. The system for extracting geothermal heat according to claim 6, wherein the heat extractor in operation uses thermal energy available at the well top part passively carried by the liberated gasses.

8. The system for extracting geothermal heat according to claim 7, wherein the liberated gas comprises methane gas.

9. The system for extracting geothermal heat according to claim 1, wherein the geothermal well has a well depth between the well top level and the well bottom level of between 1 and 6 kilometers.

10. The system for extracting geothermal heat according to claim 1, wherein the heat medium contained within the heat pipe walls comprises a radioactive heat medium.

11. A method for producing the heat extraction system according to claim 1, wherein the method comprises the steps of:
making the geothermal well in the surrounding crust material from the well top level at the crust material surface down to the well bottom level at a depth where the surrounding crust material has geothermal temperatures elevated above temperatures at the crust material surface;
filling the heat pipe at least partly with the heat medium such that the heat medium is contained within the heat pipe by the heat pipe walls;
inserting the heat pipe into the geothermal well; and
installing the heat extractor at the well top level.

12. The method for producing the heat extraction system according to claim 11, wherein the method further comprises the of:
making at least one path extending from the geothermal well into the surrounding crust material; and
filling the at least one path with the second heat conductive material.

13. Use of the heat extraction system according to claim 1, wherein the heat extraction system extracts heat from the surrounding crust material of the geothermal well to heat the heat medium within the geothermal well.

14. Use of the heat extraction system according to claim 13 wherein the heat extractor generates electricity from the heated heat medium.

15. Use of the heat extraction system according to claim 13, wherein the heat extractor comprises a heat exchanger and a usable heat circuit configured to heat a heating system, wherein the heat exchanger indirectly heats the usable heat circuit with heat available in the well top part.

\* \* \* \* \*

UNITED STATES PATENT AND TRADEMARK OFFICE
CERTIFICATE OF CORRECTION

PATENT NO. : 11,085,671 B2
APPLICATION NO. : 16/612335
DATED : August 10, 2021
INVENTOR(S) : S. Gheysens It is certified that error appears in the above-identified patent and that said Letters Patent is hereby corrected as shown below:

On the Title Page

| Column | Line | |
|---|---|---|
| 2/Abstract | 1 | change "energy:" to -- energy --. |

In the Claims

| Column | Line | |
|---|---|---|
| 20 | 50 | In Claim 14, change "13" to -- 13, --. |

Signed and Sealed this
Twenty-fourth Day of May, 2022

Katherine Kelly Vidal
*Director of the United States Patent and Trademark Office*